(12) United States Patent
Lemberger

(10) Patent No.: US 7,425,186 B2
(45) Date of Patent: Sep. 16, 2008

(54) SWIVEL ARM ASSEMBLY FOR A FRICTION GEAR OF AN ACCESSORY UNIT OF AN INTERNAL COMBUSTION ENGINE EQUIPPED WITH BELT-DRIVEN AUXILIARY UNITS

(75) Inventor: Heinz Lemberger, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/399,637

(22) Filed: Apr. 7, 2006

(65) Prior Publication Data

US 2006/0264283 A1 Nov. 23, 2006

Related U.S. Application Data

(63) Continuation of application No. PCT/EP2004/010110, filed on Sep. 10, 2004.

(30) Foreign Application Priority Data

Oct. 7, 2003 (DE) ................................ 103 46 426

(51) Int. Cl.
*F16H 13/10* (2006.01)
*F02B 67/04* (2006.01)
(52) U.S. Cl. .................... 476/48; 123/198 R; 476/28
(58) Field of Classification Search .............. 474/144, 474/151, 131, 139; 476/28, 48; 123/195 C, 123/198 R; 417/364
See application file for complete search history.

(56) References Cited

U.S. PATENT DOCUMENTS

| 255,860 | A | * | 4/1882 | Holt ........................... 241/227 |
| 2,319,379 | A | * | 5/1943 | Welch .......................... 165/41 |
| 6,907,969 | B2 | * | 6/2005 | Ichikawa et al. ............. 188/379 |

FOREIGN PATENT DOCUMENTS

| DE | 18 10 126 U | 4/1960 |
| DE | 1 087 822 B | 8/1960 |
| DE | 39 34 884 A1 | 4/1991 |

(Continued)

OTHER PUBLICATIONS

International Search Report dated Dec. 8, 2004 including English Translation of relevant portion and PCT/ISA/237 (Fifteen (15) pages).

(Continued)

*Primary Examiner*—Richard Ridley
*Assistant Examiner*—Terence Boes
(74) *Attorney, Agent, or Firm*—Crowell & Moring LLP

(57) ABSTRACT

An articulated-arm assembly for a friction gear of an internal combustion engine that is equipped with belt-driven auxiliary assemblies. The assembly comprises a friction wheel which is urged into engagement with a belt of the auxiliary belt drive, and an articulated arm which guides the friction wheel and can be pivoted about an axis. This arrangement provides a compact articulation that uses existing installation space for the mounting of the articulated-arm assembly. The articulated arm is provided on a mounting unit with a pivot actuator, and preferably with a fixing device configured as a multi-part housing that permits the entire articulated-arm assembly to be mounted on the engine.

11 Claims, 2 Drawing Sheets

FOREIGN PATENT DOCUMENTS

| | | | |
|---|---|---|---|
| DE | 102 55 073 A1 | | 6/2004 |
| DE | 102 55 074 A1 | | 6/2004 |
| DE | 102 55 075 A1 | | 6/2004 |
| DE | 10255073 A1 | * | 6/2004 |
| DE | 10255074 A1 | * | 6/2004 |
| DE | 10255075 A1 | * | 6/2004 |
| DE | 103 09 063 A1 | | 10/2004 |
| DE | 10309063 A1 | * | 10/2004 |
| EP | 1 388 655 A1 | | 2/2004 |
| EP | 1388655 A1 | * | 2/2004 |
| FR | 2 544 825 A1 | | 10/1984 |

OTHER PUBLICATIONS

German Search Report dated Jul. 6, 2004 including English Translation of relevant portion (Four (4) pages).

\* cited by examiner

SWIVEL ARM ASSEMBLY FOR A FRICTION GEAR OF AN ACCESSORY UNIT OF AN INTERNAL COMBUSTION ENGINE EQUIPPED WITH BELT-DRIVEN AUXILIARY UNITS This application is a continuation application of International application PCT/EP2004/010110 filed Sep. 10, 2004 and claims the priority of German application No. 103 46 426.3, filed Oct. 7, 2003, the disclosure of which are expressly incorporated by reference herein.

BACKGROUND AND SUMMARY OF THE INVENTION

The invention relates to a swivel arm assembly for a friction gear of an accessory unit in an internal combustion engine that is equipped with belt-driven auxiliary units, whereby, between a belt of the belt drive for the auxiliary units and a drive wheel of a separately provided accessory unit, a friction wheel establishing a drive connection is guided by a swivel arm that is linked so as to be pivotable about an axis on the engine side.

Such a swivel arm assembly is known, for example, from the unpublished German patent application 102 55 074, wherein an eccentric cam that is rotatably mounted in a bearing eye of the swivel arm and impinged on by a pretensioned torsion spring acts as an actuator for the swivel arm by pulling or pushing on the swivel arm in such a way that the friction wheel is held in a permanent drive connection with the belt and the drive wheel.

A refinement of this swivel arm assembly is disclosed in the likewise unpublished German patent application 103 09 063, wherein a servomotor acts on the eccentric cam in a predetermined rotational direction, via a gear with connection of a free-wheel device, for achieving a controlled interruption of the drive connection, in particular between the friction wheel and the drive wheel of the accessory unit, which preferably is designed as a coolant pump. This controlled deactivation of the coolant pump, in particular during and temporarily after a cold start of the internal combustion engine, advantageously warms up the engine more rapidly.

In the subject matter of both the cited patent applications, the respective swivel arm is situated on average essentially in the same plane as the belt driving the friction wheel, it being known that this plane of the belt is a considerable distance from the end face of the internal combustion engine. In both the referenced examples, in a corresponding adaptation to this distance an extension is situated on the end face for providing a rotational axis for the eccentric cam.

An object of the invention is to provide a swivel arm assembly by which use is made of the installation space gained by omission of the extension to obtain a compact linkage and attachment of the swivel arm in a simple mounting.

This object is achieved by a swivel arm equipped with the friction wheel forming a mounting unit having an actuator, situated on the linkage side, in an attachment device for mounting the swivel arm assembly as a whole on the internal combustion engine.

The invention is advantageous in that the swivel arm may be mounted on the internal combustion engine as a complete, structurally functional unit, and a torsion spring-loaded eccentric cam may serve as a very simple actuator and that, in a more complex embodiment of the actuator, a servomotor is associated with the eccentric cam for the controlled interruption of one of the drive connections of the friction wheel with the belt or with the drive wheel of the accessory unit.

In embodying the invention in both the simple and the complex designs of the actuator, the attachment device is a housing divided transverse to the axis on the engine side, and in one housing part a pivot is provided on which an eccentric cam serving as an actuator is rotatably mounted in a bearing eye on the linkage side, and corresponding to a torsion spring drive the eccentric cam acts on the swivel arm in the pulling direction or pushing direction to produce a permanent drive connection of the friction wheel with the belt and the drive wheel of the accessory unit.

For the controlled interruption of the friction wheel drive connection by means of a servomotor which adjusts the torsion spring-loaded eccentric cam in the opposite rotational direction in a controlled manner, in the other housing part a servomotor having a driving effect on the actuator is provided which, via a gear with connection of a blocking free-wheel device, acts in a controlled manner on the eccentric cam in a rotational direction which deactivates the friction wheel, and that in the other counterdirection of the eccentric cam which activates the friction wheel a pretensioned torsion spring drives the eccentric cam, whereby the unblocked free-wheel device causes a rotational interruption with respect to the servomotor.

According to the invention, the placement of the swivel arm linkage and the actuator in a multipart housing used as an attachment device achieves an advantageously compact design of the swivel arm assembly for simple mounting of same to the internal combustion engine.

In a further embodiment of the invention, a conventional direct-current motor, brushless direct-current motor, or electric stepping motor is preferably used as the actuator drive for a servomotor, and a multistage-reducing spur gear or a planetary gear is provided as the gear.

The attachment device designed as a housing according to the invention has an advantageously simple structure by the fact that the housing, having mutually centered housing parts, is attached to the internal combustion engine via corresponding flanges with openings placed on the housing parts and by use of screw bolts which extend through the housing parts, and damping elements coaxial with the screw bolts are optionally provided in the openings in both flanges to achieve a damping effect. In this manner, transmission of structure-borne noise is advantageously counteracted.

With regard to the swivel arm linkage in the housing, the housing has a passage on the outer periphery which is covered by an elastic bellows that encloses the swivel arm on the bearing eye side.

Lastly, a smooth-walled design of the swivel arm assembly advantageous for handling during mounting is achieved by the fact that the swivel arm is formed from elements having a half-shell shape, situated on both sides of a longitudinal plane in the region of the arm section of the swivel arm and in the region of a one-piece, flat-cylindrical protective housing integrally molded thereon for the friction wheel, and the elements, which are detachably or nondetachably connected to one another and enclose a hollow profile in the arm section, in each case are in one-piece connection with an axial portion of the swivel arm bearing eye. The design described above also results in a flexurally and torsionally rigid swivel arm.

Other objects, advantages and novel features of the present invention will become apparent from the following detailed description of the invention when considered in conjunction with the accompanying drawings for example.

DETAILED DESCRIPTION

Figure 1:
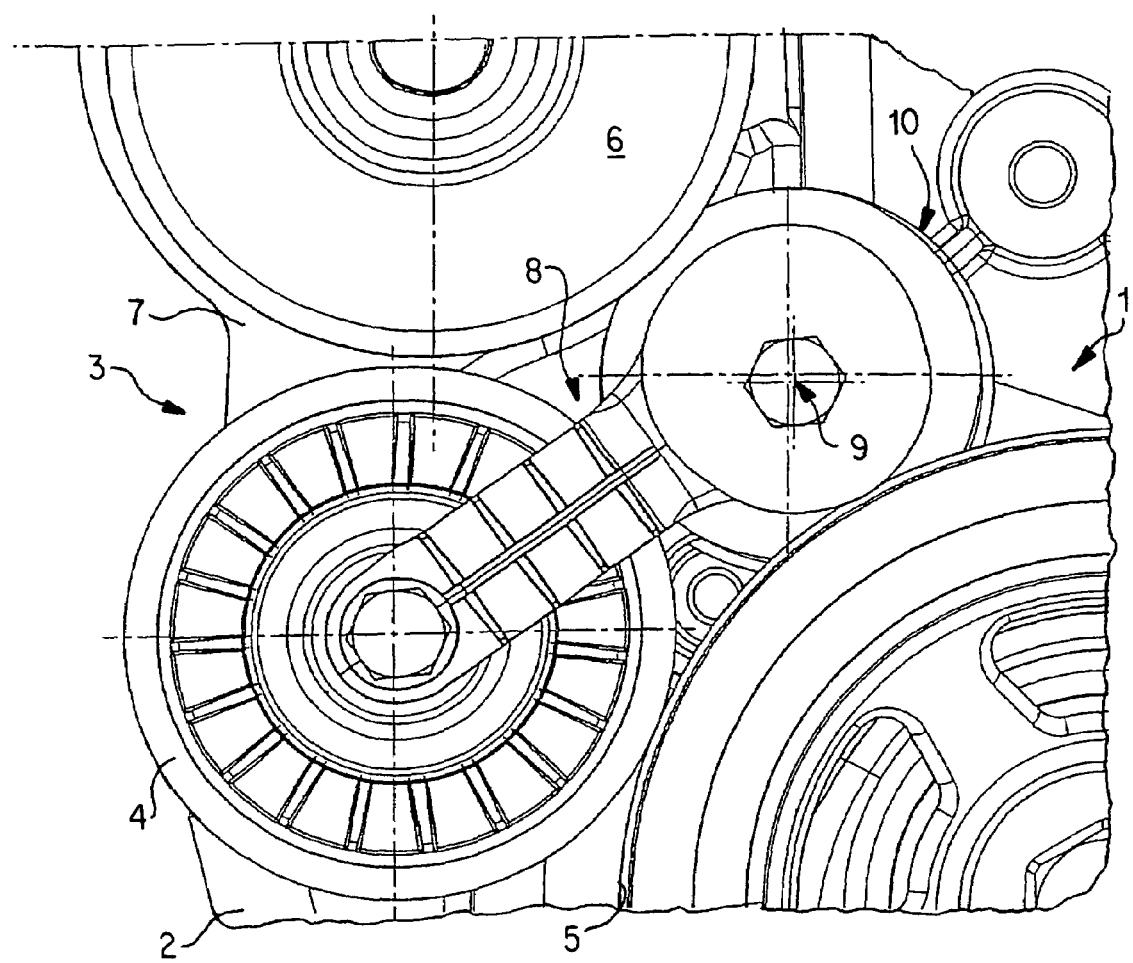
FIG. 1 shows a strictly sectional view of a belt drive together with a friction gear in accordance with an embodiment of the present invention, in which the swivel arm assembly according to the invention is not shown for better clarity.

A friction gear 3 is associated with a belt drive 1 for auxiliary units (not shown) of an internal combustion engine 2 for the permanent or controllably interruptible drive connection by means of a friction wheel 4 between a belt 5 for the belt drive 1 and a drive wheel 6 of an accessory unit 7 separately provided on the internal combustion engine 2. The friction wheel 4 which cooperates in a friction-fit manner with the exterior of the belt 5 is guided relative to the drive wheel 6 by means of a swivel arm 8, and the swivel arm 8 which is linked so as to swivel about an axis 9 on the engine side can be displaced by means of an actuator for friction-fit engagement of the friction wheel 4 with the drive wheel 6 while in simultaneous drive connection with the belt 5.

As further shown in FIG. 1, the linkage of the swivel arm 8 to a compact extension 10 is provided on the end face of the internal combustion engine 2.

To provide a swivel arm assembly by which use is made of the installation space gained by omission of the extension 10 to obtain a combined, compact linkage and attachment of the swivel arm 8 in a simple mounting, the swivel arm 8 equipped with the friction wheel 4 forms a mounting unit 11 having an actuator (eccentric cam 16) situated on the linkage side in an attachment device 12 for the complete, i.e., entire, swivel arm assembly on the internal combustion engine 2.

The attachment device 12 is a housing 13 divided transverse to the axis 9 on the engine side, and in one housing part 13' a pivot 14 is situated on which an eccentric cam 16 provided as an actuator is rotatably mounted in a bearing eye 15 of the swivel arm 8 on the linkage side, and for the relative displacement of the swivel arm 8 together with the friction wheel 4 the eccentric cam acts on the swivel arm 8, preferably in the pulling direction, corresponding to a torsion spring drive 17 to produce a friction wheel tracking for a permanent drive connection (not shown) of the friction wheel 4 with the belt 5 and the drive wheel 6. More detailed information may be obtained from the aforementioned patent application 102 55 074.

Figure 2:
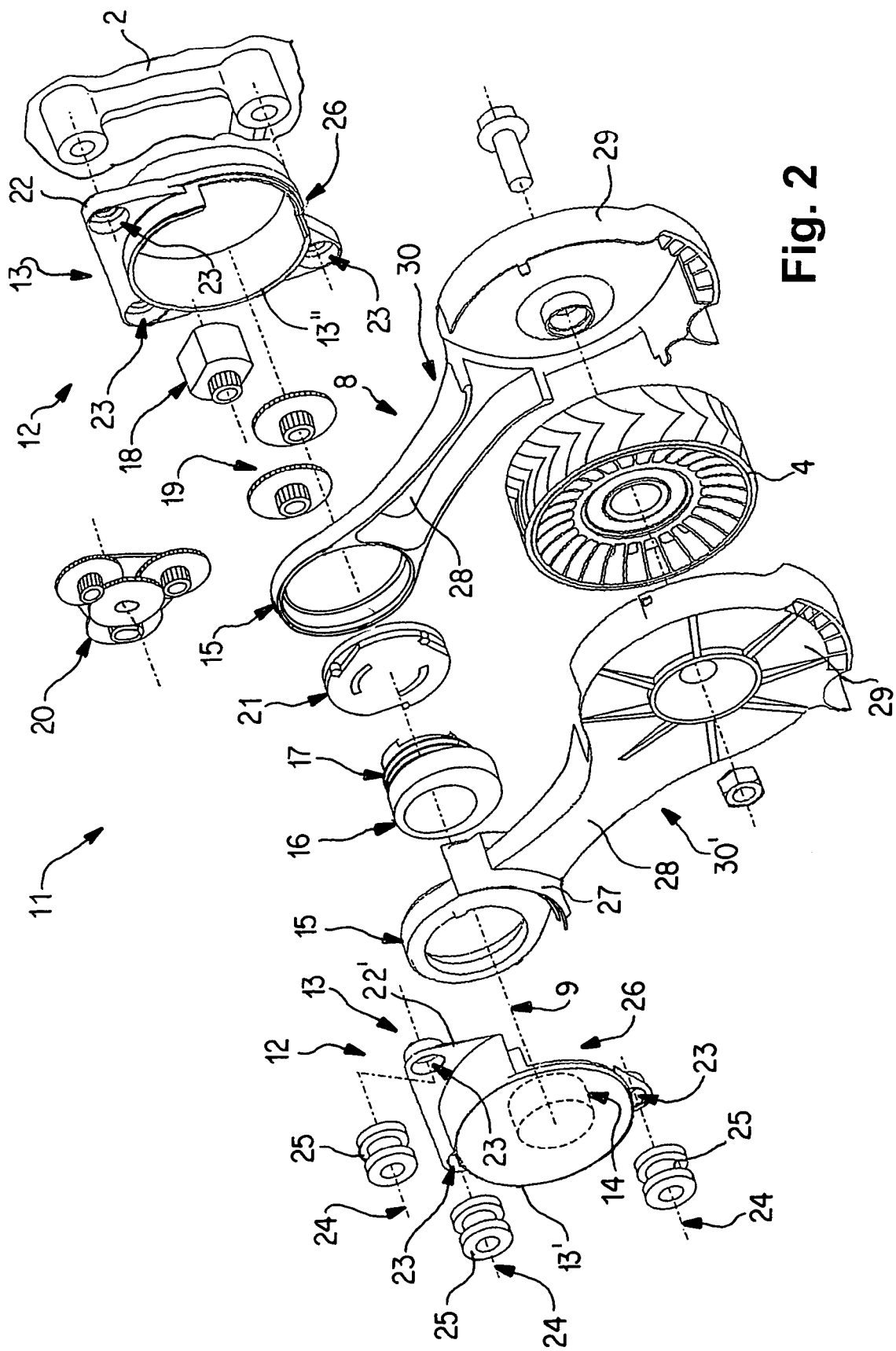
FIG. 2 shows an exploded view, a swivel arm assembly, according to an embodiment of the invention, of an accessory unit in an internal combustion engine that is equipped with belt-driven auxiliary units.

As further shown in FIG. 2, the swivel arm assembly in the other housing part 13" has a servomotor 18 which in a controlled manner via a gear 19 or 20 and with connection of a blocking free-wheel device 21 acts as an actuator on the eccentric cam 16 in a rotational direction which deactivates the friction wheel 4, against the resistance of the torsion spring drive 17. In the other counterdirection of the eccentric cam 16 which activates the friction wheel 4 as an actuator, the torsion spring drive 17 acts on the eccentric cam, whereby the unblocked or freewheeling free-wheel device 21 causes a rotational interruption with respect to the servomotor 18. For the case of a servomotor 18 that is damaged or has insufficient drive power, the free-wheel device 21 achieves a fail-safe function for the swivel arm assembly according to the invention; i.e., when the internal combustion engine 2 is running and the servomotor 18 has failed, the respective accessory unit 7 is driven or remains running. Further embodiments in this regard are contained in the aforementioned patent application 103 09 063.

A conventional direct-current motor, brushless direct-current motor, or electric stepping motor is used as the servomotor 18. The gear 19 may be a multistage-reducing spur gear. A planetary gear 20 is also possible.

The housing 13, having mutually centered housing parts 13', 13", is attached to the internal combustion engine 2 via corresponding flanges 22, 22' with openings 23 placed on the housing parts, and by use of screw bolts 24 (indicated strictly symbolically) which extend through the housing parts, and damping elements 25 coaxial with the screw bolts 24 are optionally provided in the openings 23 to suppress transmission of structure-borne noise in both flanges 22, 22'.

Furthermore, the housing 13 used as attachment device 12 has a passage 26 for the swivel arm 8 on the outer periphery which is covered by an elastic bellows 27 that encloses the swivel arm 8 on the bearing eye side.

Lastly, the swivel arm 8 is formed from elements 30, 30' having a half-shell shape, situated on both sides of a longitudinal plane in the region of the arm section 28 of the swivel arm and in the region of a one-piece, flat-cylindrical protective housing 29 for the friction wheel 4 integrally molded thereon, and the elements 30, 30', which are detachably or nondetachably connected to one another and enclose a hollow profile in the arm section 28, in each case are in one-piece connection with an axial portion of the bearing eye 15. This design is described in a further German patent application 10330672.

Replacement of the eccentric cam 16 as actuator by a servomotor, acting as actuator, situated on the swivel arm 8 so as to provide a direct drive is also within the scope of the invention.

As a whole, the invention advantageously achieves an easily mounted swivel arm assembly which makes skilled use of a compact installation space between the belt drive wheels on the end face of the internal combustion engine 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A swivel arm assembly for a friction gear of an accessory unit in an internal combustion engine equipped with belt-driven auxiliary units, comprising:
   a friction wheel; and
   a swivel arm, said swivel arm being arranged to be pivotable about a pivot axis on the engine during drive belt operation, wherein the swivel arm is in the form of a mounting unit which guides the friction wheel,
   wherein the mounting unit has an actuator for actuating engagement of the friction wheel with an auxiliary component drive belt during drive belt operation, the actuator includes an electric motor capable of being controlled to alter friction wheel engagement, and the actuator is located within an attachment portion of the mounting unit containing the pivot axis.

2. The assembly according to claim 1, wherein
   the actuator is located in an attachment device,
   the attachment device comprises a housing divided transverse to said axis, one housing part of the divided housing includes an actuator pivot, the actuator is an eccentric cam located on said actuator pivot and is rotatably mounted in a bearing eye of the swivel arm, and the eccentric cam acts on the swivel arm in a pulling direction or pushing direction in accordance with a force applied by a torsion spring drive in order to displace the friction wheel with respect to the belt.

3. The assembly according to claim 2, wherein the electric motor is a servomotor, the servomotor is provided in the other housing part of the divided housing, the servomotor acts on the eccentric cam via a gear and a free-wheel device in a direction which draws the friction wheel away from the belt in a controlled manner, and the free-wheel device allows a rotational interruption with respect to the servomotor.

4. The assembly according to claim 3, wherein the servomotor is one of a direct-current motor, a brushless direct-current motor, and an electric stepping motor, and said gear between the servomotor and the eccentric cam is at least one of a multistage-reducing spur gear and a planetary gear.

5. The assembly according to claim 2, wherein the housing is arranged to be attached to the internal combustion engine via flanges with openings arranged to accommodate screw bolts extending through the housing parts.

6. The assembly according to claim 5, wherein damping elements arranged to coaxially accommodate screw bolts are provided coaxially within the housing openings to achieve a damping effect.

7. The assembly according to claim 3, wherein the housing is arranged to be attached to the internal combustion engine via flanges with openings arranged to accommodate screw bolts extending through the housing parts.

8. The assembly according to claim 7, wherein damping elements arranged to coaxially accommodate screw bolts are provided coaxially within the housing openings to achieve a damping effect.

9. The assembly according to claim 2, wherein the housing has a passage on an periphery radially outward from the pivot axis which accommodates pivoting movement of swivel arm about the pivot axis, and the passage is provided with an elastic bellows which closes off the passage while accommodating pivoting movement of swivel arm.

10. The assembly according to claim 3, wherein the housing has a passage on an periphery radially outward from the pivot axis which accommodates pivoting movement of swivel arm about the pivot axis, and the passage is provided with an elastic bellows which closes off the passage while accommodating pivoting movement of swivel arm.

11. The assembly according to claim 1, wherein the swivel arm is formed from elements having a half-shell shape, the half-shell shape elements are located with their concave sides facing one another on opposing sides of a plane perpendicular to the pivot axis, the friction wheel is located at a wheel end of the swivel arm between protective housing sections integrally formed at the wheel end of each half-shell shape element, and the elements are one of detachably or nondetachably connected to one another.

* * * * *